US012515803B2

(12) United States Patent
Sanchez et al.

(10) Patent No.: US 12,515,803 B2
(45) Date of Patent: Jan. 6, 2026

(54) MODULE FOR SUPPLYING PRESSURIZED FRESH AIR TO AN AIR-CONDITIONING PACK OF AN AIRCRAFT CABIN, AIR-CONDITIONING SYSTEM EQUIPPED WITH SUCH A MODULE, AND CORRESPONDING METHOD

(71) Applicant: LIEBHERR-AEROSPACE TOULOUSE SAS, Toulouse (FR)

(72) Inventors: Frédéric Sanchez, Toulouse (FR); Walid Hankache, Toulouse (FR); David Lavergne, Toulouse (FR); Cédric Lance, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 351 days.

(21) Appl. No.: 18/034,694

(22) PCT Filed: Oct. 26, 2021

(86) PCT No.: PCT/EP2021/079652
§ 371 (c)(1),
(2) Date: Apr. 29, 2023

(87) PCT Pub. No.: WO2022/090210
PCT Pub. Date: May 5, 2022

(65) Prior Publication Data
US 2023/0391458 A1 Dec. 7, 2023

(30) Foreign Application Priority Data

Oct. 30, 2020 (FR) ........................................ 2011178

(51) Int. Cl.
*B64D 13/02* (2006.01)
*B64D 13/06* (2006.01)
*B64D 13/08* (2006.01)

(52) U.S. Cl.
CPC ............. *B64D 13/02* (2013.01); *B64D 13/08* (2013.01); *B64D 2013/0618* (2013.01); *B64D 2013/0688* (2013.01)

(58) Field of Classification Search
CPC ......... B64D 13/02; B64D 13/06; B64D 13/08
See application file for complete search history.

(56) References Cited

U.S. PATENT DOCUMENTS

| 4,419,926 A | * | 12/1983 | Cronin ................... B64D 13/06 454/74 |
| 9,656,756 B2 | * | 5/2017 | Atkey ....................... F02C 7/32 |
| 2018/0057172 A1 | * | 3/2018 | Sautron .................. B64D 13/06 |

FOREIGN PATENT DOCUMENTS

EP 2918497 A1 9/2015

* cited by examiner

*Primary Examiner* — Allen R. B. Schult
(74) *Attorney, Agent, or Firm* — CRGO Global; Steven M. Greenberg

(57) ABSTRACT

The invention relates to an air-conditioning system for an aircraft cabin (5) comprising: an engine air bleed device (10); an air-conditioning pack (20) comprising a pack air inlet (21) connected to said engine bleed device (10), and a pack air outlet (22) connected to said cabin (5); an auxiliary module (50) for supplying pressurized air comprising an auxiliary turbomachine (51), comprising a compressor (52) supplied with external fresh air and a turbine suitable to be able to be supplied with air coming from the engine bleed device; and a control unit configured to activate either a standard mode in which the pack air inlet is supplied with the pressurized air coming from the engine bleed device (10), or a fresh air mode in which said pack air inlet (21) is supplied with the pressurized air coming from the auxiliary module (50).

10 Claims, 2 Drawing Sheets

[Fig. 1]
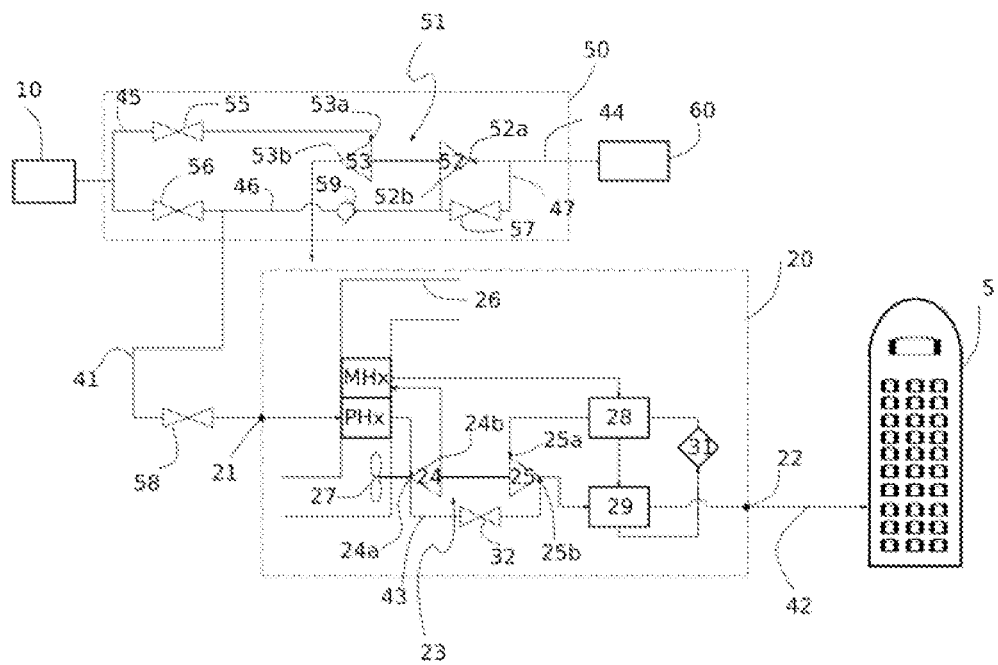
[Fig. 2]
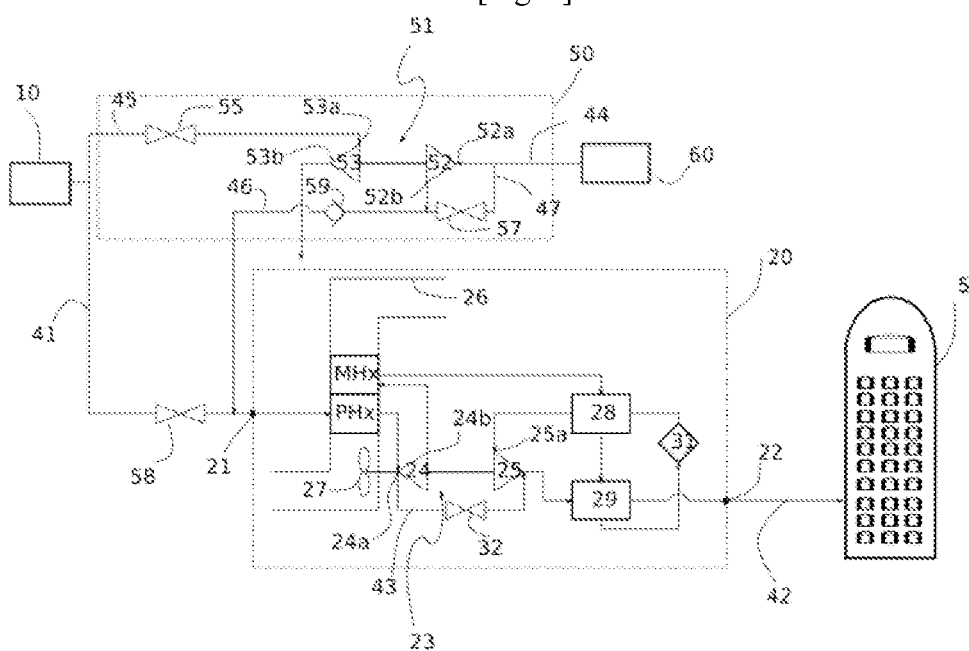

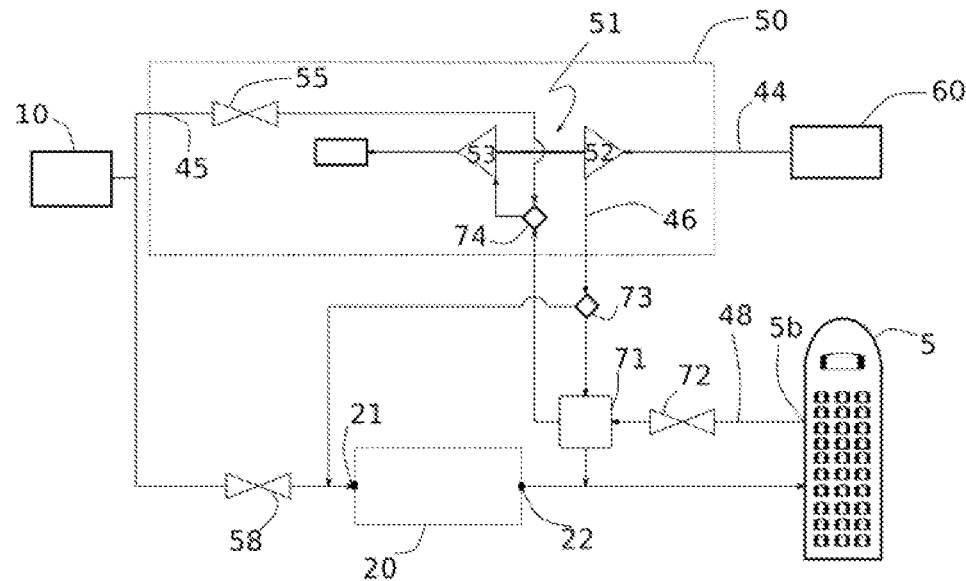
[Fig. 3]
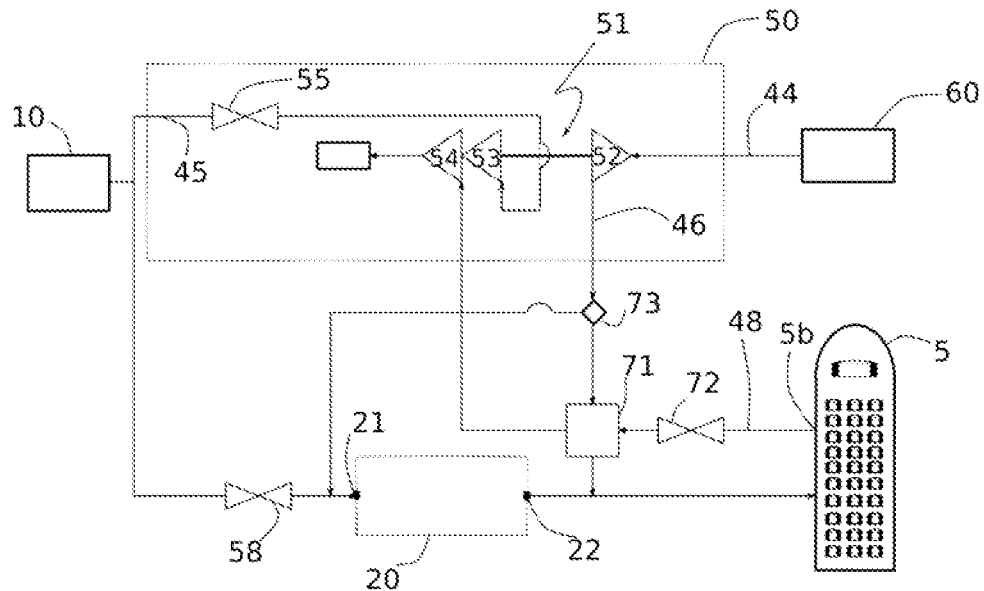
[Fig. 4]

MODULE FOR SUPPLYING PRESSURIZED FRESH AIR TO AN AIR-CONDITIONING PACK OF AN AIRCRAFT CABIN, AIR-CONDITIONING SYSTEM EQUIPPED WITH SUCH A MODULE, AND CORRESPONDING METHOD

CROSS-REFERENCE TO RELATED APPLICATIONS

This application is a § 371 national phase entry of International Application No. PCT/EP2021/079652, filed Oct. 26, 2021, which claims priority to France Patent Application No. 2011178 filed on Oct. 30, 2020.

TECHNICAL FIELD OF THE INVENTION

The invention relates to an air-conditioning system of an aircraft cabin comprising a device for bleeding air from a propulsion engine of the aircraft equipped with an auxiliary module. The invention also relates to an auxiliary module for supplying pressurized air from fresh air drawn from outside the aircraft. The invention also relates to a method of air-conditioning of an aircraft cabin using a system in accordance with the invention.

TECHNOLOGICAL BACKGROUND

Throughout the text, the term "cabin" denotes any interior space of an aircraft, the air temperature and/or pressure of which must be controlled. It may be a passenger cabin, the pilot cockpit, a hold, and generally any area of the aircraft which requires air at a controlled pressure and/or temperature. The term "turbine" refers to a rotating device intended to use the kinetic energy of the air in order to cause rotation of a shaft supporting the blades of the turbine. The term "compressor" refers to a rotating device intended to increase the pressure of the incoming air which it receives. Finally, an air flow regulating valve is said to be "open" when it permits the passage of air and "closed" when it blocks the passage of air.

An air-conditioning system of an aircraft cabin generally comprises a device for bleeding compressed air (also designated by the term "bleed air") from at least one compressor of a propulsion engine of the aircraft and a turbomachine with an air cycle comprising at least one compressor and a turbine which are coupled mechanically. The compressor is supplied with air by the compressed air bleed device after passage through a valve for regulating flow rate or pressure, and the turbine comprises an air outlet which supplies the cabin with conditioned air.

The system further comprises different heat exchangers and regulating valves. These elements (turbomachine, heat exchangers, valves, etc.) taken as a whole form an air-conditioning pack which permits the cabin to be supplied with air at controlled temperature and pressure from air at high pressure supplied by the air bleed device.

Throughout the following text, such an air-conditioning system using a device for bleeding air from a propulsion engine of the aircraft in order to inject it into the cabin after treatment by an air-conditioning pack is designated as a "conventional air-conditioning system".

The air supplied to the cabin is thus generally air bled from the propulsion engines of the aircraft which is then conditioned by the air-conditioning pack. It may be the case that this air bled from the propulsion engines is contaminated by a fume event. When such an event occurs it is currently necessary to switch off the air-conditioning pack, to reduce the altitude of the aircraft and to initiate an emergency landing procedure in order to protect the physical well-being of the passengers.

There are currently air-conditioning systems which do not bleed air from the propulsion engines and so these systems are not affected by the possible fume events mentioned above. They are e.g. electric air-conditioning systems which use turbomachines with electric motorization in order to compress air drawn from outside the aircraft and to impose on it temperature and pressure conditions which are compatible with use in the cabin. The integration of such an electric system into an aircraft necessitates considerable adaptation of the structure of the air system and so in practice it is a complex matter to simply replace the conventional air-conditioning systems with such electric systems.

The inventors have thus sought to modify a conventional air-conditioning system (i.e. a system in which the source of air at high pressure is formed by bleeding air from a propulsion engine of the aircraft) so that it can continue to operate even in the case where a fume event occurs.

In particular, the inventors have sought to develop a module which can be grafted onto a conventional air-conditioning pack in order to provide it with a new functionality enabling it to be operational even when a fume event occurs.

AIMS OF THE INVENTION

The invention thus aims to provide an air-conditioning system which makes it possible to overcome at least some of the disadvantages of the known air-conditioning systems.

In particular, the invention aims to provide an air-conditioning system comprising bleeding air at high pressure from a propulsion engine of the aircraft, which does not require an emergency landing if a fume event occurs on one of the propulsion engines of the aircraft.

The invention also aims to provide, in at least one embodiment, a module for supplying pressurized air which makes it possible to provide a conventional air-conditioning system with a new functionality, enabling it to be operational when a fume event occurs.

The invention also aims to provide, in at least one embodiment, a module for supplying pressurized air, which can be installed on an aircraft without imposing substantial modifications on the pre-existing air-conditioning system.

The invention also aims to provide, in at least one embodiment, an air-conditioning system which makes it possible to limit drag on the aircraft.

The invention also aims to provide an aircraft equipped with an air-conditioning system in accordance with the invention.

Finally, the invention aims to provide a method of air-conditioning of an aircraft cabin using an air-conditioning system in accordance with the invention.

DESCRIPTION OF THE INVENTION

In order to do this, the invention relates to an air-conditioning system of an aircraft cabin comprising:
- a device for bleeding pressurized air from a propulsion engine of the aircraft, referred to as engine bleed device,
- an air-conditioning pack comprising a pack air inlet fluidically connected to said engine bleed device, and a pack air outlet suitable to be able to be fluidically connected to said cabin in order to be able to supply it with air at controlled pressure and temperature.

The system in accordance with the invention is characterized in that it further comprises an auxiliary module for supplying pressurized air comprising:
- a turbomachine, referred to as auxiliary turbomachine, comprising at least one compressor provided with an air inlet and an air outlet, and at least one turbine provided with an air inlet and an air outlet which are mechanically coupled to each other,
- a conduit, referred to as fresh air inlet conduit, suitable to be able to fluidically connect a scoop for drawing in external air and an air inlet of the compressor,
- a conduit, referred to as bleed air inlet conduit, suitable to be able to connect in fluid communication said engine bleed device and an inlet of the turbine, said conduit being equipped with a valve for regulating the flow rate of air supplying said turbine, referred to as module valve,
- a conduit, referred to as pressurized fresh air outlet conduit, suitable to be able to fluidically connect an air outlet of the compressor and said pack air inlet.

The system is also characterized in that it comprises a unit for controlling said module valve configured to be able to activate at least the following two modes:
- a mode, referred to as standard mode, in which said module valve is closed, so that said pack air inlet is exclusively supplied with the pressurized air coming from the engine bleed device,
- a mode, referred to as fresh air mode, in which said module valve is open, so that said pack air inlet can be supplied with the pressurized air coming from the auxiliary module.

The air-conditioning system in accordance with the invention thus makes it possible to have at least two distinct operating modes: a standard mode in which the air-conditioning pack is supplied with pressurized air from the engine bleed device, and a fresh air mode in which the air-conditioning pack is supplied with pressurized air from the auxiliary module.

The auxiliary module is configured to be able to supply pressurized air from a source of fresh air drawn from outside the aircraft. In this operating mode, the air coming from the engine bleed is used only in order to rotationally drive the turbine of the auxiliary turbomachine. The air which supplies the cabin is fresh air drawn from outside and pressurized by the compressor of the auxiliary turbomachine rotationally driven by the above-mentioned turbine.

Thus, if a fume event occurs, the system can switch from the standard mode to the fresh air mode and thus ensure conditioning of the cabin without recourse to air bled from the propulsion engines of the aircraft and potentially contaminated by the fume event. In the fresh air mode, the conditioned air which supplies the cabin is external fresh air pressurized by the auxiliary module and conditioned by the air-conditioning pack.

A system in accordance with the invention thus makes it possible for the aircraft to continue its flight without the need for an emergency landing if a fume event occurs.

The switch from the standard mode to fresh air mode can be initiated directly by the pilot or automatically from dedicated sensors configured to detect the occurrence of a fume event.

The change of mode is relayed by the control unit of the system which controls the module valve arranged on the bleed air inlet conduit which connects the engine bleed device and the inlet of the turbine of the auxiliary turbomachine.

Advantageously and in accordance with a first variant of the invention, the system further comprises a regulating valve, referred to as module isolation valve, fluidically arranged between said engine bleed device and the pack air inlet, and controlled by said control unit in order to be open in said standard mode and closed in said fresh air mode.

According to this advantageous variant, the combination of the module valve and of the module isolation valve makes it possible to isolate the module from the air-conditioning pack in the standard mode, to isolate the arrival of the bleed air coming from the engine bleed device in the fresh air mode and to modulate the flow sent to the turbine of the auxiliary turbomachine.

Advantageously and in accordance with another variant of the invention, said air outlet of the compressor of said auxiliary turbomachine is connected to said pack air inlet downstream of a regulating valve, referred to as pack inlet valve, fluidically arranged between said engine bleed device and said pack air inlet.

According to this variant, the air exiting the compressor of the auxiliary turbomachine is injected downstream of a pack inlet valve which thus acts as an isolation valve for the arrival of bleed air at the air-conditioning pack.

The pack inlet valve is a pre-existing valve of conventional air-conditioning systems and is initially used to regulate the flow rate or the pressure of air coming from the engine bleed device which supplies the pack air inlet. Also, and according to this variation, the pack inlet valve, more commonly known as a flow control valve (FCV), is used, in addition to its air-regulating function in the standard mode, to isolate the arrival of air coming from the engine bleed device from the air-conditioning pack in the fresh air mode. In other words, this valve functionally replaces the module isolation valve of the first variant.

Advantageously and in accordance with the invention, the system further comprises a trap mounted on said scoop for drawing in external air and controlled by said control unit in order to be able to block the air inlet of the scoop in said standard mode.

This advantageous variant makes it possible to reduce the drag of the aircraft by blocking the entry of fresh air into the auxiliary module when this module is not in use.

Advantageously and in accordance with another variant of the invention, the system further comprises a conduit, referred to as cabin air recovery conduit, suitable to be able to fluidically connect an air outlet of the cabin—in particular a foul air outlet—and an air inlet of said turbine of said auxiliary turbomachine.

According to this advantageous variant, the cabin air is recovered in order to at least partially drive the turbine of the auxiliary turbomachine, which makes it possible to limit the bleeding of air from the propulsion engines of the aircraft.

This cabin air recovery conduit is preferably equipped with a valve for regulating the flow rate of air supplying the turbine of the auxiliary turbomachine, referred to as recovery valve.

Advantageously and in accordance with this variant, the system further comprises a three-way valve supplied on the one hand by the air flow coming from the engine bleed device and on the other hand by the air flow coming from the cabin recovery and supplying an inlet of said turbine of the auxiliary turbomachine.

This advantageous variant makes it possible to determine the air flow which supplies the turbine of the auxiliary turbomachine as a function of the operating mode (standard or fresh air).

According to this variant of the invention, the auxiliary turbomachine comprises two expansion turbines mounted in parallel, the first turbine being fluidically connected to the engine bleed device and the second turbine being fluidically connected to the cabin air recovery conduit, so as to be able to drive the auxiliary turbomachine simultaneously by the air at high pressure coming from the engine bleed device and by the cabin recovery air.

This advantageous variant makes possible simultaneous use of the energy of the air at high pressure coming from the engine bleed device and the energy of the foul air evacuated from the cabin in order to drive the auxiliary turbomachine permitting compression of the fresh air supplying the compressor of the turbomachine. This variant thus makes it possible to limit the bleeding of air from the propulsion engine of the aircraft.

Advantageously and in accordance with this variant, the system further comprises a heat exchanger arranged simultaneously on said cabin air recovery conduit and on said pressurized air outlet conduit of said auxiliary module in order to be able to ensure thermal exchanges between the air flow coming from the compressor of said auxiliary turbomachine and the air flow coming from said cabin.

According to this advantageous variant, the heat exchanger makes it possible to recover the thermal energy exiting the compressor in order to increase the temperature and thus the energy entering the turbine.

This heat exchanger is preferably arranged downstream of a three-way valve with an inlet supplied by the outlet of the compressor of the auxiliary turbomachine and by two outlets respectively supplying the air inlet of the air-conditioning pack and a conduit connecting the air outlet of the pack and the inlet of the cabin.

This heat exchanger thus makes it possible to achieve a temperature for the air exiting the module which is close to the cabin temperature.

Advantageously and in accordance with the invention, said auxiliary turbomachine is a four-wheel turbomachine comprising two turbines in series and two compressors in series, mechanically coupled to each other.

The invention also relates to an auxiliary module for supplying pressurized air to an air-conditioning system of a cabin of an aircraft comprising a device for bleeding pressurized air from a propulsion engine of the aircraft and an air-conditioning pack comprising a pack air inlet fluidically connected to said pressurized air bleed device, and a pack air outlet fluidically connected to said cabin in order to be able to supply it with air at controlled pressure and temperature.

The module in accordance with the invention is characterized in that it comprises:
  a turbomachine, referred to as auxiliary turbomachine, comprising at least one compressor provided with an air inlet and an air outlet, and at least one turbine provided with an air inlet and an air outlet which are mechanically coupled to each other,
  a conduit, referred to as fresh air inlet conduit, suitable to be able to fluidically connect a scoop for drawing in external air and an air inlet of the compressor,
  a conduit, referred to as bleed air inlet conduit, suitable to be able to connect in fluid communication said pressurized air bleed device and an inlet of the turbine, said conduit being equipped with a valve for regulating the air flow rate, referred to as module valve, controlled by a control unit in order to be able to activate at least one of the following two modes:
    a mode, referred to as standard mode, in which said module valve is closed, so that said pack air inlet is exclusively supplied with the air coming from the pressurized air bleed device,
    a mode, referred to as fresh air mode, in which said module valve is open, so that said pack air inlet can be supplied with the pressurized air coming from the auxiliary module,
  a conduit, referred to as pressurized fresh air outlet conduit, suitable to be able to fluidically connect an air outlet of the compressor and said pack air inlet.

The technical effects and advantages of an air-conditioning system in accordance with the invention apply mutatis mutandis to an auxiliary module in accordance with the invention.

Furthermore, an auxiliary module in accordance with the invention can equip a conventional air-conditioning system in order to provide it with a new service-continuity functionality, including in the event that a fume event occurs (provided, of course, that this fume event is localized upstream of the air-conditioning pack and not within the air-conditioning pack).

The invention also relates to an aircraft comprising at least one propulsion engine, a cabin and an air-conditioning system of said cabin, characterized in that said air-conditioning system is in accordance with the invention.

The technical effects and advantages of an air-conditioning system in accordance with the invention apply mutatis mutandis to an aircraft in accordance with the invention.

The invention also relates to a method of air-conditioning of an aircraft cabin comprising:
  bleeding pressurized air from a propulsion engine of the aircraft,
  conditioning air intended to supply the cabin by an air-conditioning pack, comprising a pack air inlet fluidically connected to said pressurized air bleed device, and a pack air outlet, fluidically connected to said cabin in order to be able to supply it with air at controlled pressure and temperature.

The method in accordance with the invention is characterized in that it further comprises:
  supplying pressurized air by an auxiliary module for supplying pressurized air comprising:
    a turbomachine, referred to as auxiliary turbomachine, comprising at least one compressor provided with an air inlet and an air outlet, and at least one turbine provided with an air inlet and an air outlet which are mechanically coupled to each other,
    a conduit, referred to as fresh air inlet conduit, suitable to be able to fluidically connect a scoop for drawing in external air and an air inlet of the compressor,
    a conduit, referred to as bleed air inlet conduit, suitable to be able to connect in fluid communication said pressurized air bleed device and an inlet of the turbine, said conduit being equipped with a valve for regulating the air flow rate, referred to as module valve,
    a conduit, referred to as pressurized fresh air outlet conduit, suitable to be able to fluidically connect an air outlet of the compressor and said pack air inlet.
  and controlling said module valve in order to be able to activate at least one of the following two modes:
    a mode, referred to as standard mode, in which said module valve is closed, so that said pack air inlet is exclusively supplied with the air coming from the pressurized air bleed device, a mode, referred to as fresh air mode, in which said module valve is open, so that said pack air inlet can be supplied with the pressurized air coming from the auxiliary module.

The technical effects and advantages of an air-conditioning system in accordance with the invention apply mutatis mutandis to an air-conditioning method in accordance with the invention.

The invention also relates to an air-conditioning system, an auxiliary module for supplying pressurized air to an aircraft and a method of air-conditioning of a cabin of an aircraft which are characterized in combination by all or some of the features mentioned above or below.

LIST OF FIGURES

Other aims, features and advantages of the invention will become apparent upon reading the following description given solely in a non-limiting way and which makes reference to the attached figures in which:

FIG. 1 is a schematic view of an air-conditioning system in accordance with a first embodiment of the invention, FIG. 2 is a schematic view of an air-conditioning system in accordance with a second embodiment of the invention, FIG. 3 is a schematic view of an air-conditioning system in accordance with a third embodiment of the invention, FIG. 4 is a schematic view of an air-conditioning system in accordance with a fourth embodiment of the invention.

DETAILED DESCRIPTION OF AN EMBODIMENT OF THE INVENTION

In the figures, for the sake of illustration and clarity, scales and proportions have not been strictly respected. Furthermore, identical, similar or analogous elements are designated by the same reference signs in all the figures.

FIG. 1 schematically illustrates an air-conditioning system of a cabin 5 of an aircraft in accordance with a first embodiment.

The air bleed system comprises a device for bleeding air at high pressure from a propulsion engine of the aircraft, referred to as engine bleed device 10, an air-conditioning pack 20 and an auxiliary module 50 for supplying pressurized air.

The air-conditioning pack 20 comprises a pack air inlet 21 fluidically connected to the engine bleed device 10 by a conduit 41, and a pack air outlet 22 suitable to be able to be fluidically connected to the cabin 5 by a conduit 42 in order to be able to supply it with air at controlled pressure and temperature. This conduit 41 is further equipped with a regulating valve, referred to as pack inlet valve 58 in order to regulate the flow rate of air which supplies the air inlet 21 of the air-conditioning pack 20.

The air-conditioning pack 20 further comprises an air-cycle turbomachine 23 comprising a compressor 24 and an expansion turbine 25 mechanically coupled to each other by a mechanical shaft.

The compressor 24 comprises an air inlet 24a connected to the air inlet 21 of the pack by means of a primary heat exchanger for cooling purposes, referenced PHX in the figures and conduits not referenced in the figures for the sake of clarity.

Thus, the air at high pressure coming from the engine bleed device 10 supplies the compressor 24 of the air-cycle turbomachine 23 after passage into the primary heat exchanger PHX. This PHX comprises a hot pass formed by the air supplied by the engine bleed device via the conduit 41 and a cold pass supplied with air at dynamic pressure which flows in a channel 26 for the flow of dynamic air, referred to hereinafter as dynamic air channel.

The flow of dynamic air in the dynamic air channel 26 is ensured e.g. by a fan 27 mounted on the shaft of the air-cycle turbomachine 23 which extends into the dynamic air channel 26. According to other variants, the fan 27 can be separate from the shaft and rotationally driven by an independent electric motor.

The compressor 24 also comprises an air outlet 24b fluidically connected to a main heat exchanger, referred to as MHx in the figures, which is arranged in the channel 26 for the flow of dynamic air drawn from outside the aircraft.

This MHX comprises a hot primary circuit supplied by the air flow coming from the compressor 24 and a cold secondary circuit, in thermal interaction with the primary circuit, supplied by the dynamic air flowing in the dynamic air channel 26. In other words, the air coming from the compressor 24 is cooled in the MHX by the dynamic air flowing in the dynamic air flow channel 26.

The expansion turbine 25 of the air-cycle turbomachine 23 comprises an air inlet 25a supplied with the air coming from the MHX after passing through a water extraction loop, described below, and an air outlet 25b connected to said cabin 5, in order to be able to supply it with air at controlled pressure and temperature.

The water extraction loop comprises, in accordance with the embodiment in the figures, a heater 28 comprising a primary air circuit supplied with the air coming from the MHX, in thermal interaction with a secondary circuit supplied with the air coming from a water extractor 31 and intended to supply the inlet 25a of the expansion turbine.

The water extraction loop also comprises a condenser 29 comprising a primary air circuit supplied by the air flow exiting the heater 28, in thermal interaction with a secondary air circuit supplied by the air flow coming from the expansion turbine 25 in order to permit condensation of the air flow of the primary circuit.

Finally, the extraction loop also comprises a water extractor 31 arranged at the exit of the condenser 29 and configured to be able to recover the water condensed by the condenser. In a known manner, this recovered water can be injected into the dynamic air flow channel upstream of the MHx and PHx by a conduit which is not shown in the figures for the sake of clarity.

The air-conditioning pack according to the embodiment in the figures also comprises a regulating valve 32 arranged on a conduit 43 which connects the inlet 24a of the compressor and the outlet 25b of the turbine.

FIG. 1 also illustrates the auxiliary module 50 for supplying pressurized air.

This module 50 comprises a turbomachine, referred to as auxiliary turbomachine 51, comprising a compressor 52 provided with an air inlet 52a and an air outlet 52b, and a turbine 53 provided with an air inlet 53a and an air outlet 53b which are mechanically coupled to each other.

The module further comprises a fresh air inlet conduit 44 fluidically connecting a scoop 60 for drawing in external air and the air inlet 52a of the compressor 52.

The module 50 also comprises a bleed air inlet conduit 45 connecting the engine bleed device 10 and the inlet 53a of the turbine 53. This conduit 45 is equipped with a valve for regulating the flow rate of air supplying said turbine, referred to as module valve 55.

The module 50 also comprises a pressurized fresh air outlet conduit 46, suitable to be able to fluidically connect the air outlet 52b of the compressor and the pack air inlet 21. In order to do this, the conduit 46 opens into the conduit 41 which connects the engine bleed device 10 and the air inlet 21 of the pack, upstream of the valve 58. This conduit 46 is further equipped with a non-return valve 59.

According to the embodiment of FIG. 1, the module also comprises a conduit 47 equipped with a valve 57 which makes it possible to bypass the compressor 52 if necessary.

In this embodiment, the module 50 also comprises a module isolation valve 56 arranged on the conduit 41 between the engine bleed device 10 and the pack air inlet 21.

Finally, the air-conditioning system comprises a control unit, not shown in the figures for the sake of clarity, configured to be able to control at least the module valve 55 and the module isolation valve 56 so as to be able to activate at least one of the following two modes:
- a standard mode, in which the module valve 55 is closed and the module isolation valve 56 is open so that the pack air inlet 21 is exclusively supplied with the pressurized air coming from the engine bleed device 10. In fact, in this configuration, the air coming from the engine bleed device 10 is channeled by the conduit 41 to the inlet 21 of the air-conditioning pack which can treat the air in order to bring it to the temperature and pressure which are compatible with injection into the cabin 5.
- a fresh air mode in which the module valve 55 is open and the module isolation valve 56 is closed so that the pack air inlet 21 is supplied with the pressurized air coming from the auxiliary module 50. In fact, in this configuration, the air coming from the engine bleed device rotationally drives the turbine 53 which itself drives the compressor 52. This compressor, supplied with fresh air drawn from outside by the scoop 60, compresses this air and supplies it to the conduit 46 which opens into the conduit 41 which supplies the air inlet 21 of the air-conditioning pack. Thus, the pack is supplied with air at high pressure, which has not come from the propulsion engine of the aircraft.

Thus, this architecture makes it possible to supply the air-conditioning pack with pressurized air obtained from fresh air drawn from outside the aircraft if a fume event occurs.

The control unit can also control the other valves of the air-conditioning system, in particular the valves 58, 57 and 32, depending on the air-conditioning requirements of the cabin.

FIG. 2 is an embodiment variant of the system of FIG. 1. The air-conditioning pack is identical to that of FIG. 1 and is not described again.

The auxiliary module 50 has a similar architecture except for the module isolation valve 56 which is omitted and the conduit 46 which opens downstream of the pack inlet valve 58.

Thus, in this embodiment, the isolation function is provided by this pack inlet valve 58 and no longer by the valve 56 of the first embodiment, which is omitted in this embodiment.

Otherwise, the operation of the module 50 is identical to the first embodiment and makes it possible to switch the system from a standard mode in which the air at high pressure supplied to the pack air inlet 21 comes from the engine bleed device 10 to a fresh air mode in which the air at high pressure supplied to the pack air inlet 21 comes from the module 50.

FIG. 3 is another embodiment variant for which the detail of the air-conditioning pack 20 is not illustrated for the sake of clarity. The particular feature of this embodiment is the recovery of some of the cabin energy in order to ensure the driving of the turbomachine 51 of the auxiliary module.

Thus, the air injected into the cabin 5 is a mixture of the air bled from the engine bleed device 10 and conditioned by the air-conditioning pack 20 and the air drawn from outside and compressed by the turbomachine 51 driven by the air evacuated from the cabin.

In order to do this, the system comprises a cabin air recovery conduit 48 connecting an air outlet 5b of the cabin and the air inlet of the turbine 53 of the auxiliary turbomachine 51. This conduit is equipped with a valve 72 for regulating the air flow rate.

The system further comprises a three-way valve 74 with two inlets respectively supplied by the air flow coming from the engine bleed device 10 and the air flow channeled by the cabin air recovery conduit 48 and an outlet supplying the inlet of the turbine 53.

The system also comprises a heat exchanger 71 arranged simultaneously on the cabin air recovery conduit 48 and on the pressurized air outlet conduit 46 of the auxiliary module in order to be able to ensure thermal exchanges between the air flow coming from the compressor 52 and the air flow coming from said cabin 5.

The system also comprises a three-way valve 73 with an inlet supplied by the air flow coming from the compressor 52 and two outlets respectively supplying the heat exchanger 71 and the air inlet 21 of the air-conditioning pack 20.

Irrespective of the embodiment, the air coming from the turbine 53 of the turbomachine 53 of the auxiliary module is ejected to the outside of the aircraft.

FIG. 4 is a variant of the system of FIG. 3 in which the three-way valve 74 is omitted and in which the auxiliary turbomachine comprises two turbines 53 and 54 each supplied by a distinct air flow coming respectively from the engine air bleed device 10 and the cabin air recovery 5. This hybrid solution makes it possible to rotationally drive the turbomachine 51, and thus the compressor 52, simultaneously by the air flow at high pressure coming from the engine bleed device and by the cabin recovery air flow.

The invention is not limited only to the embodiments described. In particular, the turbomachine 51 of the auxiliary module can be a two-wheel turbomachine, as described, or a four-wheel turbomachine, e.g. with two compressors and two turbines mounted in series. Other types of machines can also be used without compromising the technical effect to which the invention relates.

The invention claimed is:

1. An air-conditioning system for an aircraft cabin comprising:
- a device for bleeding pressurized air from a propulsion engine of the aircraft, referred to as engine bleed device,
- an air-conditioning pack comprising a pack air inlet fluidically connected to said engine bleed device, and a pack air outlet suitable to be able to be fluidically connected to said cabin in order to be able to supply it with air at controlled pressure and temperature,
- an auxiliary module for supplying pressurized air comprising:
  - a turbomachine, referred to as auxiliary turbomachine, comprising at least one compressor provided with an air inlet and an air outlet, and at least one turbine provided with an air inlet and an air outlet which are mechanically coupled to each other, a conduit, referred to as fresh air inlet conduit, suitable to be able to fluidically connect a scoop for drawing in external air and said air inlet of the compressor, a conduit, referred to as bleed air inlet conduit, suitable to be able to connect in fluid communication said engine bleed device and said inlet of the turbine, said conduit being equipped with a valve for regulating the flow rate of air supplying said turbine, referred to as module valve, a conduit, referred to as pressurized fresh air outlet conduit, suitable to be able to fluidically connect said air outlet of the compressor and said pack air inlet, and a unit for controlling said module valve configured to be able to activate at least the following two modes:

a mode, referred to as standard mode, in which said module valve is closed, so that said pack air inlet is exclusively supplied with the pressurized bleed air coming from the engine bleed device, a mode, referred to as fresh air mode, in which said module valve is open, so that said pack air inlet can be supplied with the pressurized air coming from the auxiliary module and wherein said bleed air coming from said engine bleed device is ejected to the outside the aircraft.

2. The system as claimed in claim 1, further comprising a regulating valve, referred to as module isolation valve, fluidically arranged between said engine bleed device and the pack air inlet, and controlled by said control unit in order to be open in said standard mode and closed in said fresh air mode.

3. The system as claimed in claim 1, wherein said air outlet of the compressor of said auxiliary turbomachine is connected to said pack air inlet downstream of a regulating valve, referred to as pack inlet valve, fluidically arranged between said engine bleed device and said pack air inlet.

4. The system as claimed in claim 1, further comprising a trap mounted on said scoop for drawing in external air and controlled by said control unit in order to be able to block the air inlet of the scoop in said standard mode.

5. The system as claimed in claim 1 further comprising a conduit, referred to as cabin air recovery conduit, suitable to be able to fluidically connect an air outlet of the cabin and an air inlet of said turbine of said auxiliary turbomachine.

6. The system as claimed in claim 5, further comprising a three-way valve with two inlets respectively supplied by the air flow coming from the engine bleed device and the air flow coming from the cabin recovery and an outlet supplying an inlet of said turbine of the auxiliary turbomachine.

7. The system as claimed in claim 5, further comprising a heat exchanger arranged simultaneously on said cabin air recovery conduit and on said pressurized air outlet conduit of said auxiliary module in order to be able to ensure thermal exchanges between the air flow coming from the compressor of said auxiliary turbomachine and the air flow coming from said cabin.

8. The system as claimed in claim 1, wherein said auxiliary turbomachine is a four-wheel turbomachine comprising two turbines in series and two compressors in series, mechanically coupled to each other.

9. An auxiliary module for supplying pressurized air to an air-conditioning system of a cabin of an aircraft comprising a device or bleeding pressurized air from a propulsion engine of the aircraft and an air-conditioning pack comprising a pack air inlet fluidically connected to said pressurized air bleed device, and a pack air outlet fluidically connected to said cabin in order to be able to supply it with air at controlled pressure and temperature, the module comprising:

a turbomachine, referred to as auxiliary turbomachine, comprising at least one compressor provided with an air inlet and an air outlet, and at least one turbine provided with an air inlet and an air outlet which are mechanically coupled to each other, a conduit, referred to as fresh air inlet conduit, suitable to be able to fluidically connect a scoop for drawing in external air and said air inlet of the compressor, a conduit, referred to as bleed air inlet conduit, suitable to be able to connect in fluid communication said pressurized air bleed device and said air inlet of the turbine, said conduit being equipped with a valve for regulating the air flow rate, referred to as module valve, controlled by a control unit in order to be able to activate at least the following two modes:

a mode, referred to as standard mode, in which said module valve is closed, so that said pack air inlet is exclusively supplied with the bleed air coming from the pressurized air bleed device, a mode, referred to as fresh air mode, in which said module valve is open, so that said pack air inlet can be supplied with the pressurized air coming from the auxiliary module and wherein said bleed air coming from said engine bleed device is ejected to the outside the aircraft, a conduit, referred to as pressurized fresh air outlet conduit, suitable to be able to fluidically connect said air outlet of the compressor and said pack air inlet.

10. An aircraft comprising at least one propulsion engine, a cabin and an air-conditioning system of said cabin, said air-conditioning system comprising:

a device for bleeding pressurized air from a propulsion engine of the aircraft, referred to as engine bleed device, an air-conditioning pack comprising a pack air inlet fluidically connected to said engine bleed device, and a pack air outlet suitable to be able to be fluidically connected to said cabin in order to be able to supply it with air at controlled pressure and temperature, an auxiliary module for supplying pressurized air comprising:

a turbomachine, referred to as auxiliary turbomachine, comprising at least one compressor provided with an air inlet and an air outlet, and at least one turbine provided with an air inlet and an air outlet which are mechanically coupled to each other, a conduit, referred to as fresh air inlet conduit, suitable to be able to fluidically connect a scoop for drawing in external air and said air inlet of the compressor, a conduit, referred to as bleed air inlet conduit, suitable to be able to connect in fluid communication said engine bleed device and said inlet of the turbine, said conduit being equipped with a valve for regulating the flow rate of air supplying said turbine, referred to as module valve, a conduit, referred to as pressurized fresh air outlet conduit, suitable to be able to fluidically connect said air outlet of the compressor and said pack air inlet, and a unit for controlling said module valve configured to be able to activate at least the following two modes:

a mode, referred to as standard mode, in which said module valve is closed, so that said pack air inlet is exclusively supplied with the pressurized bleed air coming from the engine bleed device, a mode, referred to as fresh air mode, in which said module valve is open, so that said pack air inlet can be supplied with the pressurized air coming from the auxiliary module and wherein said bleed air coming from said engine bleed device is ejected to the outside the aircraft.

\* \* \* \* \*